United States Patent [19]

Yamamoto et al.

[11] Patent Number: 4,760,392

[45] Date of Patent: Jul. 26, 1988

[54] TRANSMITTER FOR RADIO REMOTE CONTROL SYSTEM FOR MODEL DRIVE UNIT

[75] Inventors: Michio Yamamoto; Satoshi Sekiya, both of Mobara, Japan

[73] Assignee: Futaba Denshi Kogyo K.K., Mobara, Japan

[21] Appl. No.: 6,160

[22] Filed: Jan. 23, 1987

[30] Foreign Application Priority Data

Mar. 19, 1986 [JP] Japan .................................. 61-61754

[51] Int. Cl.[4] ................................................ H04Q 1/00

[52] U.S. Cl. ............................ 340/825.69; 340/825.72

[58] Field of Search ................................ 367/197–199; 340/825.69, 825.72, 543; 455/603, 34, 12, 8, 17; 370/104, 80

[56] References Cited

U.S. PATENT DOCUMENTS

| | | | |
|---|---|---|---|
| 4,038,590 | 7/1977 | Knowlton | 340/825.69 X |
| 4,072,898 | 2/1978 | Hellman et al. | 340/825.69 X |
| 4,177,426 | 12/1979 | Gaishin et al. | 340/825.69 |
| 4,405,924 | 9/1983 | Shinoda et al. | 340/825.72 |
| 4,413,261 | 11/1983 | Greenberg | 340/825.69 X |
| 4,703,359 | 10/1987 | Rumbolt et al. | 455/603 |

*Primary Examiner*—Ulysses Weldon
*Attorney, Agent, or Firm*—Oblon, Fisher, Spivak, McClelland & Maier

[57] ABSTRACT

A transmitter for a radio remote control system for a model drive unit such as a model plane capable of eliminating a necessity of corresponding a plurality of controlled objects to one transmission section while replacing them one by one, as well as eliminating a necessity of switching between wiring connections in the transmission section even when the transmission section is commonly used in view of a custom of control varied depending upon a state, to thereby facilitate the operation of changing channel allocation without malfunction. The transmitter is so constructed that an offset value is computed for every channel depending on set self-addresses and connection addresses and stored for every channel and an execution address is computed depending on a channel address value representing each channel and the offset value of each channel and supplied to a multiplexer to cause it to change an order of selection of control voltages, so that an order of alternative supply of each control voltage to a time slot allocated to each channel or an order of allocation of each control voltage to each channel may be changed.

7 Claims, 3 Drawing Sheets

TRANSMITTER FOR RADIO REMOTE CONTROL SYSTEM FOR MODEL DRIVE UNIT

BACKGROUND OF THE INVENTION

1. Field of the Invention

This invention relates to a radio remote control system for a model drive unit such as a model plane or the like, and more particularly to a radio remote control system which is adapted to transmit a transmission code representing a control data from a transmission section including a radio transmitter and receive the signal at a receiving section including a radio receiver mounted on a controlled object such as a model car, a model plane or the like to carry out remote control or variable sections of the controlled object, and which is capable of electrically changing relationships between the control data and the variable sections of the controlled object by simple manual operation.

2. Description of the Prior Art

A transmission section of a conventional radio remote control system is constructed as shown in FIG. 3. In the conventional control system, variable resistors 2 and 3 operatively connected to one control lever 1 on a control panel and a variable resistor 4 operatively connected to another control lever 1' on the control panel are separately arranged corresponding to channels respectively allocated to variable sections of a controlled object. The variable resistors 2, 3 and 4 each are connected at one end thereof to a common power supply V and at the other end thereof to the grounds to form a bleeder. The variable resistors 2, 3 and 4 constitute control voltage generating circuits 2A, 3A and 4A, respectively.

When a controlled object is, for example, a model plane, the variable resistor 2 allocated to a first channel is in charge of control of an aileron (aileron of main wing), the variable resistor 3 for a second channel is in charge of control of an elevator (aileron of horizontal tail) and the variable resistor 4 for a third channel is in charge of control of a throttle.

The two control levers 1 and 1' on the control panel are generally operable in both longitudinal and lateral directions, and the variable resistors 2, 3 and 4 are separately operated corresponding to the operation of the control levers 1 and 1' for every displacement region of the levers.

Sliders 2*a*, 3*a* and 4*a* of the variable resistors 2, 3 and 4 in the control voltage generating circuits 2A, 3A and 4A are connected to input terminals of a multiplexer 5, respectively, which is, in turn, connected at an output terminal thereof to a subsequent analog-digital converter 6. The analog-digital converter 6 is connected at an output terminal thereof through a data bus 6*a* comprising a plurality of wires and led out therefrom to an input terminal of a parallel-serial conversion circuit 7. The parallel-serial conversion circuit 7 is connected at an output terminal thereof through a pair of data lines 7*a* to an input terminal of a radio transmitter 8 having a transmitting antenna 8*a*, a clock pulse oscillating circuit 9, and an address counter 10. The counter 10 is connected at an output terminal thereof to an address terminal of the multiplexer 5 through an address bus 10*a* comprising a plurality of wires.

In the conventional control system, the operation of the two control levers 1 and 1' in the respective displacement regions for the purpose of control causes the sliders 2*a*, 3*a* and 4*a* of the variable resistors 2, 3 and 4 to be slided so that control voltages E1, E2 and E3 corresponding to the amounts of displacement of the control levers 1 and 1' may be induced across the sliders 2*a*, 3*a* and 4*a*, which are, in turn, supplied to the input terminals of the multiplexer 5, respectively.

Supposing that an address code C4 to the multiplexer 5 designates its first input terminal, the control voltage E1 supplied to the first input terminal of the multiplexer 5 is selected and induced across the output terminal of the multiplexer. The voltage E1 is then supplied to the analogdigital converter 6 where it is converted into a parallel digital code and is supplied in the form of a control voltage code C1 representing the control voltage E1 through the data bus 6*a* to the parallel-serial conversion circuit 7.

The parallel-serial conversion circuit 7 receiving the parallel control voltage code C1 assembles the code C1 into an ordinal transmission code and converts the transmission code into a serial transmission code C2 of a bit rate defined by a frequency of a clock pulse S1 from the clock pulse oscillating circuit 9. The transmission code C2 thus converted is then transferred through the data lines 7*a* to the radio transmitter 8 for transmitting the code C2 to a radio receiver mounted on the receiving section (not shown).

The parallel-serial conversion circuit 7 supplies a completion code C3 to the address counter 10 to carry out stepping of the code when it completes transfer of the transmission code C2 corresponding to one channel of the control voltage code C1 derived from the control voltage E1. Then, the address counter 10 supplies an address code C4 representing a subsequent address through an address bus 10*a* to an address terminal of the multiplexer 5, and the multiplexer 5 selects the control voltage E2 supplied to the second input terminal thereof and supplies it through the output terminal thereof to the analog-digital converter 6.

In this manner, when the transmission code C2 for the first channel representing one control voltage is transmitted, stepping of the address code C4 to the multiplexer 5 is carried out to select a subsequent control voltage, and the transmission code C2 for the second channel representing the control voltage is transmitted. In the same manner, a control data indicated by the amount of displacement of each of the control levers 1 and 1' in its displacement region is subjected to timesharing for each of the channels allocated to the respective variable sections, and then the receiving section which has received it by means of the radio receiver positionally changes each of the variable sections corresponding to the amount of displacement of each of the control levers 1 and 1' to carry out remote control of the controlled object.

In the conventional control system described above, the control data in the transmission section or allocation of the control voltage for every operation of each of the control levers to each of the channels is fixedly specified depending on a wiring connection in the transmission section and allocation of each of the variable sections to each of the channels in the receiving section is also fixedly specified. However, this construction, when one receiving section is controlled in a manner to fixedly correspond to one transmission section or one controlled object, does not cause significant inconvenience because it is merely required to fixedly make appropriate channel allocation at the time of manufacturing of the transmission section.

In general, channel allocation is differently or separately made depending on a type of a controlled object such as a model plane, a model helicopter, a model car or the like. Also, it is separately made depending on a difference in a custom of control between states. For example, in regard to a model plane, a throttle is allocated to a third lever of a control lever on a right side in Japan, whereas it is allocated to a second channel of a control lever on a left side in Europe.

However, it has been recently desired to correspond a plurality of controlled objects to one transmission section in a manner to replace the objects one by one or commonly use one transmission section and one receiving section irrespective of a difference in a custom of control between states so that such a control system of a high grade may be manufactured at a low cost.

In the conventional control system, a change of channel allocation is highly troublesome, because the change must be carried out by switching between wiring connections in the transmission section.

SUMMARY OF THE INVENTION

The present invention has been made in view of the foregoing disadvantages of the prior art.

Accordingly, it is an object of the present invention to provide a transmitter for a radio control system for a model drive unit which is capable of positively accomplishing a change of channel allocation by highly simplified channel change operation.

It is another object of the present invention to provide a transmitter for a radio remote control system for a model drive unit which is capable of eliminating a necessity of corresponding a plurality of controlled objects to one transmission section while replacing them one by one.

It is a further object of the present invention to provide a transmitter for a radio remote control system for a model drive unit which is capable of eliminating a necessity of switching between wiring connections in a transmission section even when the transmission section is commonly used in view of a custom of control varied depending upon a state.

It is still another object of the present invention to provide a transmitter for a radio remote control system for a model drive unit which is capable of facilitating a change of channel allocation without malfunction.

In accordance with the present invention, a transmitter for a radio remote control system for a model drive unit is provided. In the transmitter, a channel offset value is stored for each of channel addresses depending upon set self-addresses and connection addresses and read for the channel address to compute an execution address, to thereby ensure the switching operation of a multiplexer depending on the execution address. Thus, a change of channel allocation is readily carried out by only designating the self-address representing a first channel to be subjected to allocation change operation and the connection address representing a second channel to which the first channel is to be allocated after the change.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a transmitter for a radio remote control system for a model drive unit according to the present invention will be described hereinafter with reference to FIGS. 1 and 2.

Figure 1:
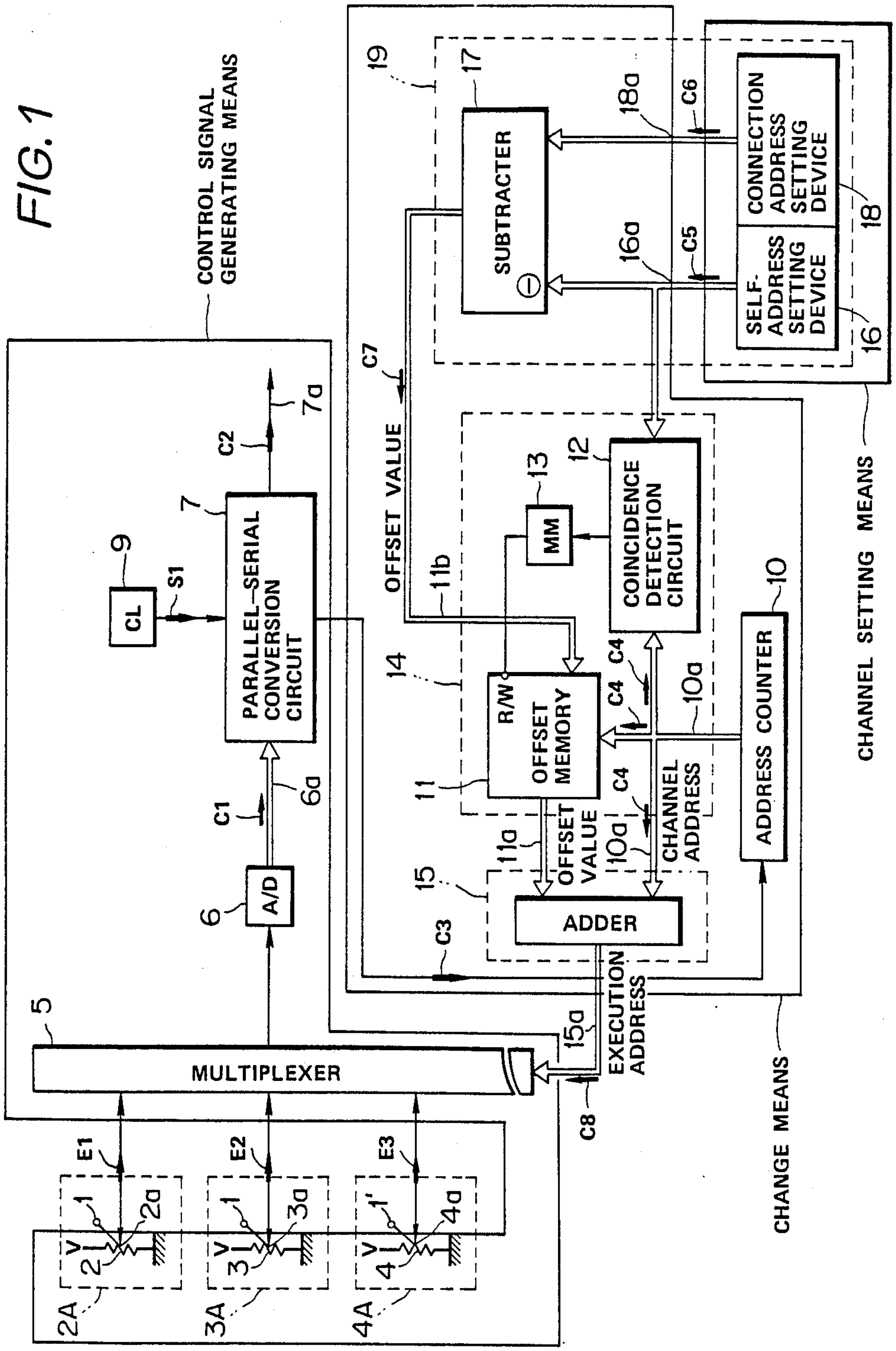
FIG. 1 is a block diagram showing an embodiment of a transmitter for a radio remote control system for a model drive unit according to the present invention.

FIG. 1 illustrates an embodiment of the present invention.

In a radio remote control system shown in FIG. 1, an address bus 10*a* extending from an address counter 10 is connected to an address terminal of an offset memory 11 formed of a random access memory and branched for the connection to one of input terminals of a coincidence detection circuit 12 formed of a digital comparator. An output terminal of the coincidence detection circuit 12 is connected through a monostable multivibrator 13 to a control terminal of the offset memory 11. The connected offset memory 11, coincidence detection circuit 12 and monostable multivibrator 13 constitute an offset memory means 14 together.

The address bus 10*a* of the address counter 10 is further branched for the connection to one of input terminals of a digital adder 15 serving as an execution address operation means, with the other input terminal thereof being connected to an output signal line 11*a* led out from the offset memory 11. An output terminal of the adder 15 is connected through an execution address bus 15*a* to an address terminal of a multiplexer 5.

To the other input terminal of the coincidence detection circuit 12 is connected to a self-address line 16*a* led out from a self-address setting device 16 formed of a digital code setting device. The self-address line is branched for the connection to an operation terminal of a digital subtracter 17, which has a subtracted terminal connected through a connection address line 18*a* to an output terminal of a connection address setting device 18 comprising a digital code setting device and an output terminal connected through an input signal line 11*b* to the offset memory 11.

The connected self-address setting device 16, digital subtracter 17 and connection address setting device 18 constitute an offset value operation means 19 together.

Figure 3:
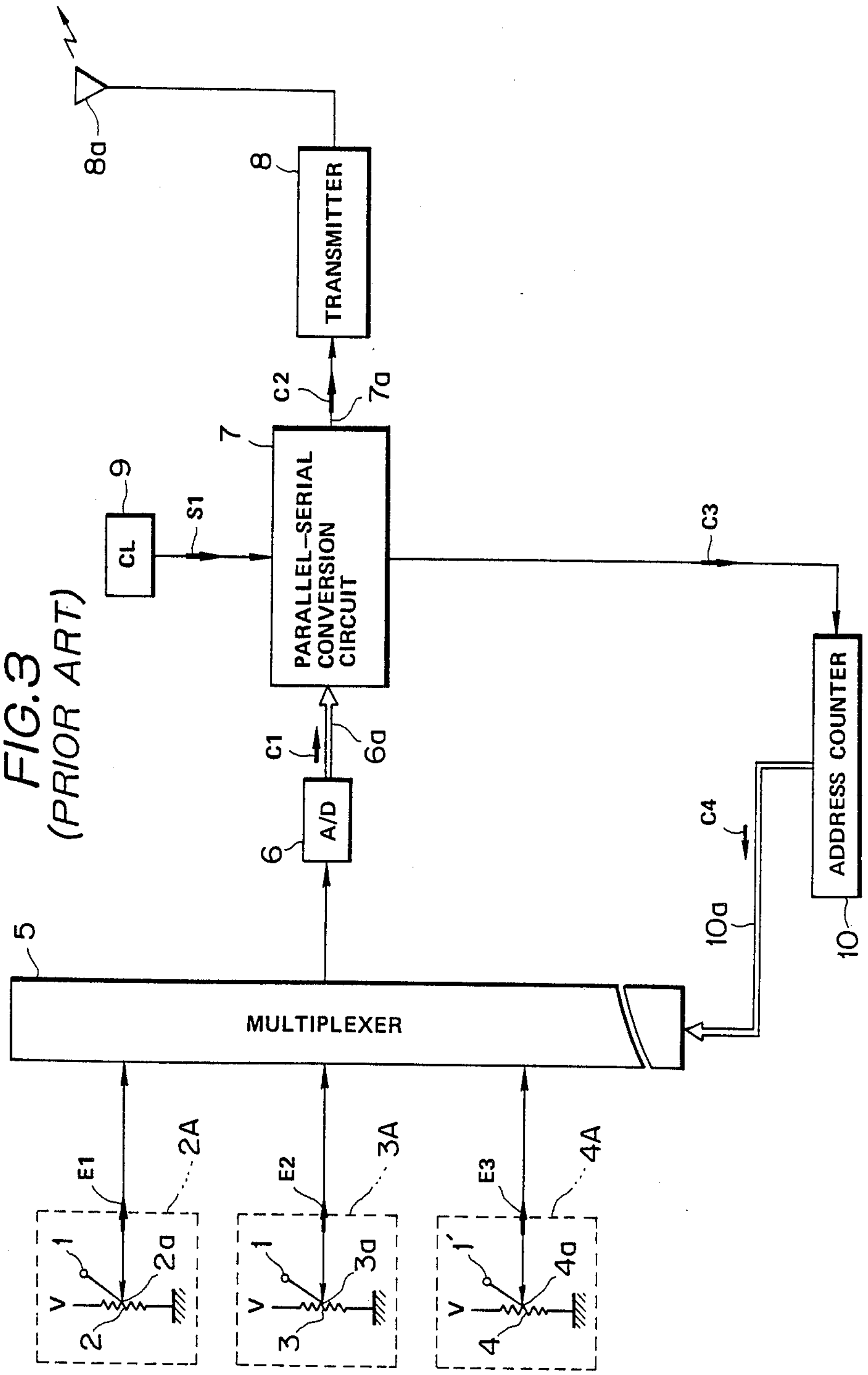
FIG.3 (PRIOR ART)
FIG. 3 is a block diagram showing a conventional radio remote control system.

The remaining of the radio remote control system shown in FIG. 1 may be constructed in substantially the same manner as the above-described conventional system shown in FIG. 3.

As described above, in the system of the illustrated embodiment, when self-addresses and connection addresses are designated during channel change operation, the offset value operation means 19 computes an offset value corresponding to each of the self-addresses and the offset memory means 14 readably stores therein the offset value for each of channel addresses. When the channel address steps to coincide with the self-address, the memory means 14 reads the offset value associated with the self-address in response to a channel address code C4 representing the channel address and supplies it to the execution address operation means 15, which computes an execution address depending on the channel address and offset value at that time. In response to an execution address code C7 representing the execution address, the multiplexer 5 alternatively selects control voltages E1, E2 and E3 controllable by the control levers 1 and 1', so that an order of selection of the control voltages by the multiplexer 5 may be changed to switch a channel designated for the self-address and to be subjected to allocation change to a channel designated for the connection address and to be allocated after the change.

Now, the manner of operation of the radio remote control system constructed as described above will be described hereinafter with reference to FIGS. 1 and 2.

During normal operation wherein any channel change operation is not carried out, an offset value stored for each of the channel addresses of the offset memory 11 is rendered zero. Thus, the digital adder 15 of which one input terminal constantly receives the offset value does not carry out any processing, resulting in a channel address code C4 being supplied from the address counter 10 through the address bus 10*a* and execution address bus 15*a* directly to the address terminal of the multiplexer 5. In this instance, the system carries out the same operation as the conventional system shown in FIG. 3.

The channel change operation for carrying out mutual channel change between the first channel and the third channel will be described with reference to FIGS. 1 and 2.

Figure 2:
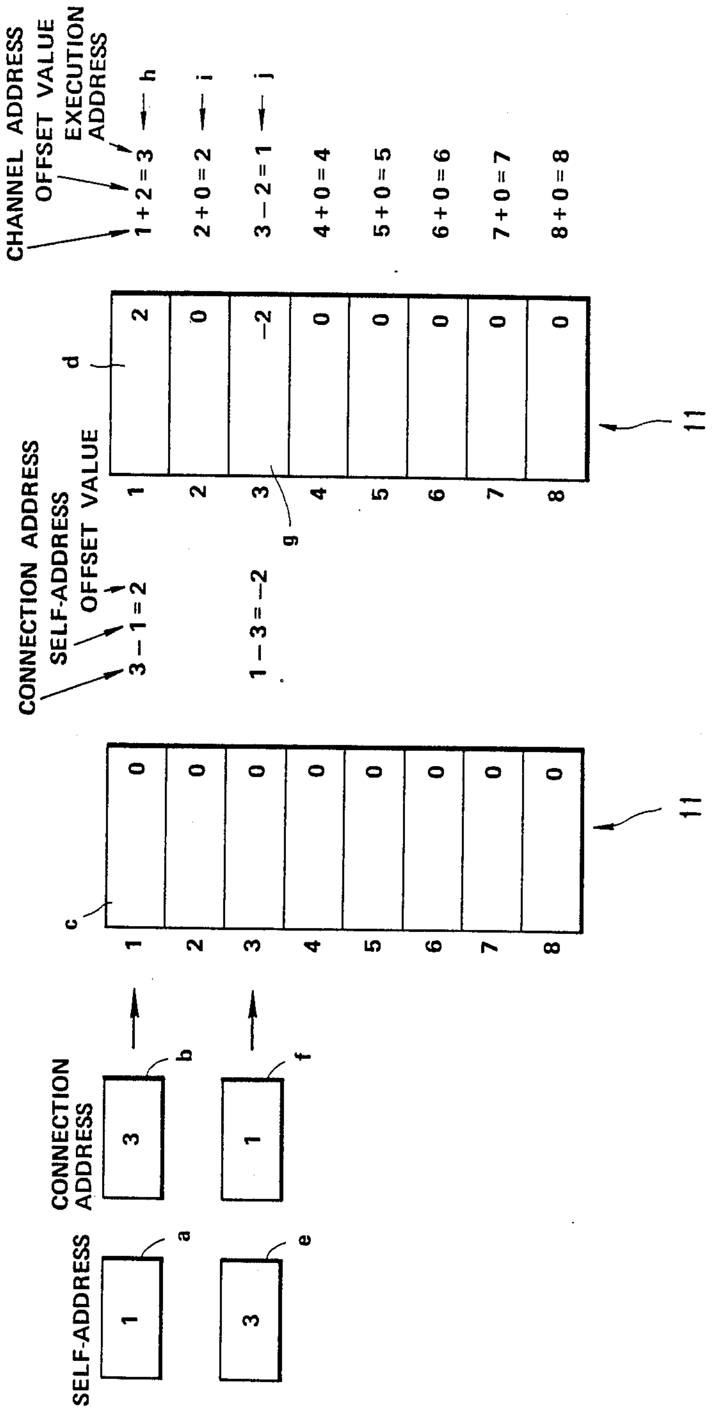
FIG. 2 is a block diagram showing the manner of operation of an offset mmemory.

For a first step, a self-address (1) indicated at reference character "a" in FIG. 2 which represents a channel to be subjected to the channel change operation is manually set in the self-address setting device 16, and concurrently a connection address (3) indicated at "b" in FIG. 2 which represents a channel to which the channel subjected to the channel change operation is to be allocated after the operation is manually set in the connection address setting device 18.

A channel address code C4 is supplied through the address bus 10*a* to one of the input terminals of the coincidence detection circuit 12 from the address counter 10 stepping every time when a control voltage code C1 representing each of the control voltages E1, E2 and E3 is converted into a transmission code C2 due to parallel-serial conversion, and then the detection circuit 12 detects that the code C4 coincides with a self-address code C5 supplied to the other input terminal of the detection circuit through the self-address line 16*a*. In this instance, the channel address code C4 represents the first channel, and the monostable multivibrator 13 is subjected to trigger to supply "1" to the control terminal of the offset memory 11 during only a semistable period of time which is considerably short as compared with a time slot allocated to each of the channels which is a time required to assemble one transmission code in the parallel-serial conversion circuit 7 to transfer the "1" to a write mode.

During the operation, the supply of a self-address code C5 to a subtraction terminal of the digital subtractor 17 through the self-address line 16*a* and t supply of a connection address code C6 to the subtracted terminal of the subtracter through the connection address line 18*a* are concurrently carried out. Thus, the digital subtracter 17 carries out processing for computing an offset value by subtracting the self-address from the connection address in response to the supplied codes, resulting in an offset code C7 which represents the offset value being supplied through the input signal line 11*b* to the offset memory 11. At this time, the offset value is stored in an address designated by the address code C4 supplied to the address terminal of the memory 11.

During the above-described operation, the digital subtracter 17 carries out subtraction of the self-address (1) ("a" in FIG. 2) from the connection address (3) ("b" in FIG. 2), and a result (2) of the subtraction is renewedly stored in a first address ("c" in FIG. 2) in the offset memory 11 which corresponds to the first channel address and is previously cleared to store (0) therein ("d" in FIG. 2).

Subsequently, a second step of the channel change operation is carried out with respect to the other channel to be changed. In the illustrated embodiment, a self-address of (3) is set in the connection address setting device 16 ("e" in FIG. 2), and concurrently a connection address (1) is set in the connection address setting device 18 ("f" in FIG. 2). Then, the digital subtracter 17, offset memory 11, address counter 10, coincidence detection circuit 12 and monostable multivibrator 13 cooperate together in a manner as described above to renewedly store an offset value of (−2) in a third address of the offset memory 11 corresponding to the third channel ("g" in FIG. 2).

In subsequent normal operation, the monostable multivibrator 13 returns to and is kept at a stable state to cause the control terminal of the offset memory 11 to be locked at "0", resulting in the offset memory operating in a read mode.

From the offset memory 11 of which the address terminal has received the channel address codes C4 from the address counter 10 stepping every time when the assembly of one transmission code C2 is completed in the parallel-serial conversion circuit 7, an offset value stored in each address corresponding to each of the channel address codes C4 or an offset value for each channel is read out and supplied through the output signal line 11*a* to the one input terminal of the digital adder 15 in synchronism with stepping of the channel.

At this time, the channel address code C4 is concurrently supplied to the other input terminal of the adder 15 from the address counter 10. Thus, the adder adds the offset value of the channel to the value of the channel address to obtain an execution address, resulting in an execution address code C8 representing the execution address being supplied through the execution address bus 15*a* to the address terminal of the multiplexer 5.

In the operation described above, the offset value of (2) for the first channel in the time slot allocated to the first channel is designated by the channel address code C4 representing the first channel and read out from the first address in the offset memory 11, and the channel address code C4 of (1) is added to the read offset value to obtain the execution address of (3) ("h" in FIG. 2), resulting in the execution address code C8 which indicates the execution address being supplied to the multiplexer 5.

In response to the supply, the multiplexer 5 selects the control voltage E3, which is to be supplied in a time slot originally allocated to the third channel, supplied to a third input terminal of a time slot allocated to the first channel and supplies it to an analog-digital converter 6.

In a time slot allocated to the subsequent second channel, the address (0) is read from a second address of the offset memory 11 in response to the channel address code C4 representing the second channel, and the execution address coincides with the channel address ("i" in FIG. 2). Accordingly, in response to the execution address code C8 representing the second channel, the multiplexer 5 selects the control voltage E2 supplied to a second input terminal from the time slot allocated to the second channel and supplies it to the analog-digital converter 6.

Further, in a time slot allocated to the third channel, the offset value of (−2) for the third channel is read from the third address of the offset memory 11 in response to the channel address code C4 representing the third channel and then the channel address code C4 of (3) representing the third channel is added to the read offset value to obtain the execution address of (1) ("j" in FIG. 2), resulting in the execution address code C8 which represents the obtained execution address being supplied to the multiplexer 5, in which the control voltage E1 to be supplied to the time slot originally allocated to the first channel is selected and supplied to the analog-digital converter 6.

Thereafer, the above operation is repeated. During the operation, the other channels are set at an offset value of (0). Accordingly, they are not subjected to the channel change operation.

As can be seen from the foregoing, the present invention is so constructed that the offset value is computed for every channel depending on the set self-addresses and set connection addresses and stored for every channel and the execution address is computed depending on the channel address value representing each channel and the offset of each channel and supplied to the multiplexer to cause it to change an order of selection of the control voltages so that an order of alternative supply of each control voltage to the time slot allocated to each channel or an order of allocation of each control voltage to each channel may be changed. This construction eliminates a necessity of corresponding a plurality of controlled objects to one transmission section while replacing them one by one. Also, it eliminates a necessity of switching between wiring connections in the transmission section even when the transmission section is commonly used in view of a custom of control varied depending upon a state. Thus, the present invention significantly facilitates the operation of changing channel allocation without malfunction.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A transmitter for a radio remote control system for a model drive unit, comprising:

a plurality of control levers arranged corresponding to channels;

a control signal generating means for generating control signals depending on displacement of said control levers in a predetermined order including a control voltage generating circuit for generating a control voltage depending on displacement of each of said control levers and an analog-digital converter for generating said control voltage in the form of a control voltage code obtained by converting said control voltage into a parallel digital signal;

a transmission means for transmitting a signal associated with each of said control signals;

a channel setting means for setting self-channels and connection channels; and a change means for changing said order of generating said control signals depending on said self-channels and connection channels set by said channel setting means.

2. A transmitter as defined in claim 1 wherein said control signal generating means includes a parallel-serial conversion circuit for converting said control voltage code generated from said analog-digital converter into a serial transmission code.

3. A transmitter as defined in claim 2, wherein said change means includes an address counter which steps every time when said parallel-serial conversion circuit generates said transmission code, to thereby generate a channel address code therefrom.

4. A transmitter as defined in claim 3, wherein said control signal generating means includes a multiplexer which alternatively selects said control voltages of said control voltage generating circuit in response to an execution address code associated with said channel address code and supply it to said parallel-serial conversion circuit.

5. A transmitter as defined in claim 1, wherein said change means includes an offset value operation means for computing an offset value for each of said self-channels depending on said set self-channels and connection channels.

6. A transmitter as defined in claim 5, wherein said change means includes an offset memory means which readably stores therein an offset valueof a self-address for each channel address, and reads and outputs therefrom said offset value of said self-address in response to a channel address code representing said channel address coinciding with said self-address.

7. A transmitter as defined in claim 6, wherein said change means includes an execution address operation means which computes an execution address depending on said channel address represented by said channel address code and said offset value read and output from said offset memory means and supplies an execution address code representing said execution address to said control signal generating means.

* * * * *